(12) United States Patent
Suzuki et al.

(10) Patent No.: US 7,699,070 B2
(45) Date of Patent: Apr. 20, 2010

(54) SHUTOFF VALVE APPARATUS AND MASS FLOW CONTROL DEVICE WITH BUILT-IN VALVE

(75) Inventors: Shigehiro Suzuki, Kuwana (JP); Ryu Sasaki, Kuwana (JP)

(73) Assignee: Hitachi Metals, Ltd., Tokyo (JP)

( * ) Notice: Subject to any disclaimer, the term of this patent is extended or adjusted under 35 U.S.C. 154(b) by 38 days.

(21) Appl. No.: 11/736,178

(22) Filed: Apr. 17, 2007

(65) Prior Publication Data
US 2007/0240769 A1 Oct. 18, 2007

(30) Foreign Application Priority Data
Apr. 17, 2006 (JP) ............... 2006-113708

(51) Int. Cl.
*F16K 31/128* (2006.01)
(52) U.S. Cl. .................. 137/486; 251/25; 251/30.01
(58) Field of Classification Search ........... 137/625.64, 137/625.65, 487.5; 251/30.01, 25
See application file for complete search history.

(56) References Cited

U.S. PATENT DOCUMENTS

| | | | | |
|---|---|---|---|---|
| 2,948,118 A | * | 8/1960 | Exner et al. ............... | 60/326 |
| 3,458,769 A | * | 7/1969 | Stampfli .................. | 361/147 |
| 3,734,128 A | * | 5/1973 | Etcheverry et al. ........ | 137/596.2 |
| 4,531,547 A | * | 7/1985 | Hadden .................. | 137/625.64 |
| 4,640,093 A | * | 2/1987 | Eastman ................. | 60/39.281 |
| 5,836,571 A | * | 11/1998 | Streitman et al. .......... | 251/331 |
| 5,850,853 A | * | 12/1998 | Ohmi et al. .............. | 137/606 |
| 6,062,246 A | | 5/2000 | Tanaka et al. | |
| 7,007,707 B2 | * | 3/2006 | Ambrosina et al. ........ | 137/9 |
| 2004/0094740 A1 | * | 5/2004 | Itoi ...................... | 251/331 |
| 2005/0189506 A1 | * | 9/2005 | Lee .................... | 251/30.01 |
| 2007/0075284 A1 | * | 4/2007 | Masamura et al. ......... | 251/63.5 |

FOREIGN PATENT DOCUMENTS

| | | |
|---|---|---|
| JP | 11-154022 | 8/1999 |
| JP | 2006-038832 | 2/2006 |
| WO | WO 02/086632 A2 | 10/2002 |
| WO | WO 03/064926 A1 | 8/2003 |
| WO | WO 2005045288 A1 * | 5/2005 |

\* cited by examiner

*Primary Examiner*—John Rivell
*Assistant Examiner*—William McCalister
(74) *Attorney, Agent, or Firm*—Paul F. Neils, Esq.; Akerman Senterfitt

(57) ABSTRACT

Shutoff valve apparatus comprising: a valve block having a valve chest on which gas collects temporarily, an inlet flow path which makes gas flow into a valve chest, an outlet flow path into which gas is made to flow out of a valve chest, a valve seat located in the inlet port of an inlet flow path, or the outlet port, a diaphragm valve element located in the opposed position of the valve seat and closes the valve port by contacting with the valve seat, pressing means for pressing diaphragm valve element, an actuator plate disposed at the opposite side of the valve chest so that the diaphragm valve element may be opposed, an operation chamber divided with the actuator plate, and an operation gas supply exhaust mechanism in which operation gas is made to supply or exhaust into the operation chamber.

7 Claims, 10 Drawing Sheets

| Number of times of Opening and Closing | Cv value | Pressure of Operation gas | External leak [10⁻¹¹Pa·m³/s] | | | Seat leak [10⁻¹¹Pa·m³/s] | | |
|---|---|---|---|---|---|---|---|---|
| | | | B.G. | 3minutes after inspection start | Judgment | B.G. | 3minutes after inspection start | Judgment |
| 0 | 0.07 | 0.40 | 3.4 | 3.3 | ○ | 3.4 | 90.0 | ○ |
| 500k | | | 12.0 | 0.5 | ○ | 0.5 | 8.3 | ○ |
| 1,000k | | | 0.5 | 0.5 | ○ | 0.5 | 44.0 | ○ |
| 2,000k | | | 2.4 | 0.8 | ○ | 0.8 | 45.0 | ○ |

FIG. 7

SHUTOFF VALVE APPARATUS AND MASS FLOW CONTROL DEVICE WITH BUILT-IN VALVE

BACKGROUND OF THE INVENTION

1. Field of the Invention

This invention relates to a flow control device for measuring the flow of fluids in relatively low flow levels such as gas, and shutoff valve apparatuses built into the mass flow control device mentioned above.

2. Description of the Related Art

Semiconductor devices such as semiconductor integrated circuits and the like are generally produced by using several types of semiconductor manufacturing devices to repeatedly carry out etching, CVD film formation or the like, on semiconductor wafers or the like. In such cases a mass flow controlling device such as a mass flow controller is used because of the need to precisely control the supply of trace amounts of processing gas. See, for example, patent document 1 (Japanese Patent publication No. 11-154022 A2) and patent document 2 (Japanese Patent publication No. 2006-38832).

The structure of common mass flow controllers is illustrated in FIG. 8. FIG. 8 schematically illustrates the structure of an example of a conventional mass flow controller inserted into a gas piping, and FIG. 8 is a circuit diagram illustrating the flow detection means in a mass flow controller.

As illustrated, the mass flow controller 2 is inserted into a flow path, such as a gas piping 4, through which a fluid such as a liquid or gas flows, so as to control the mass flow. A vacuum is created, for example, inside of a piping of the semiconductor manufacturing device connected to one end of the gas piping 4. The mass flow controller 2 has a flow path 6 formed by means of stainless steel, for example, both ends of which are connected to the gas piping 4. The mass flow controller 2 includes mass flow detection means 8 located in the upstream stage of the flow path 6, and a flow control valve mechanism 10 located in the downstream stage.

The mass flow detection means 8 has a bypass assembly 12 comprising a bundle of a plurality of bypass tubes located upstream in the direction in which the gas fluid flows in the flow path 6. A sensor tube 14 is connected to both ends of the bypass assembly 12 to bypass the assembly, allowing a smaller amount of gas fluid compared to the bypass assembly 12 to flow at a constant rate therein. That is, a constant proportion of gas relative to the total gas flow always flows into the sensor tube 14. A pair of control resistor wires R1 and R4 connected in series are wound around the sensor tube 14, and flow signals S1 indicating the mass flow level are output by a sensor circuit 16 connected thereto.

The flow signal S1 is input to a control means 18 formed using a microcomputer, for example. The mass flow of the gas currently flowing is determined based on the flow signal S1. The flow control valve mechanism 10 is controlled so that the determined mass flow is consistent with the mass flow represented by an input flow set-point signal S0. The flow control valve mechanism 10 has a flow control valve 20 located on the downstream side of the flow path 6. The flow control valve 20 has a diaphragm 22 made of bendable metal plate, for example, as a valve for directly controlling the mass flow of the gas fluid.

The diaphragm 22 is moved toward the valve orifice 24 by being appropriately bent and reshaped, to allow the aperture or the opening degree of the valve orifice 24 to be controlled as desired. The upper surface of the diaphragm 22 is connected to the bottom end of an actuator 26 formed using a laminated piezoelectric element (piezo element), thereby allowing the aperture to be adjusted in the manner described above. The actuator 26 is operated by means of the valve drive voltage S2 output by the valve drive circuit 28 upon receiving a drive signal from the control means 18. An electromagnetic actuator may sometimes be used instead of a laminated piezoelectric element as the actuator 26.

Although it is necessary to stop completely a gas flow into the semiconductor manufacturing device side depending on some cases, the complete stop of gas flow is difficult because the structure of the flow control valve mechanism 10 is suitable for the flow control, not for shutoff, in the mass flow control device 2 as described above. For this reason, the shutoff valve apparatus is commonly installed in the upstream or downstream or at both sides of the mass flow control device 2. Such shutoff valve apparatus is used also at the time of zero adjustment and calibration of the mass flow control device 2.

For example, as indicated in the patent document 1 and shown in FIG. 9, the shutoff valve apparatus 30 with the pneumatic piston-cylinder actuator is plumbed to the mass flow control device 2 separately.

FIG. 9 shows an example of the conventional piping form of a mass flow control device and the shutoff valve apparatus. The shutoff valve apparatus is connected to the downstream side of the mass flow control device separately therein.

Regarding a shutoff valve apparatus of a normally open type, the shutoff valve apparatus with the pneumatic piston-cylinder actuator can easily acquire a higher power than the actuator 26 by enlarging the air contacted surface area of the cylinder. Thus, the pneumatic piston cylinder actuator has the advantage in shutoff performance of the diaphragm valve.

However, since sealing components, such as O-rings, which are commonly placed between a piston and a cylinder of this kind of pneumatic actuator of the shutoff valve apparatus, interrupt the movement of the cylinder by the friction drag, the valve may not return to the open state only by the elastic repulsion force of the metal diaphragm. Therefore, it is necessary to have a spring, etc., as an auxiliary component to open a valve certainly.

For this reason, the valve actuator consists of many parts. The structure is complicated and the size is large.

Additionally, the capacity in the gas pipe 4A, which is a connected portion between the above-mentioned mass flow control device 2 and the shutoff valve apparatus 30, e.g., a few cc, cannot be ignored as the dead volume. Since the gas remaining in the portion is the gas which the above-mentioned mass flow control device 2 cannot control, when semiconductor manufacturing devices are operated, etc., that is, when a process is resumed after closing the above-mentioned shutoff valve apparatus 30, the above-mentioned remaining gas must always be discarded. Therefore, there is a problem that the wasteful consumption of processing gas is large.

Then, the manner of integrating the above-mentioned shutoff valve apparatus 30 into the mass flow control device 2 is also proposed (FIGS. 1-3 in the patent document 1. FIG. 9 in the patent document 2).

For miniaturization, the shutoff valve apparatus of the direct sealing type whose diaphragm is driven directly with the compressed operation gas is disclosed in the patent document 1.

The shutoff valve apparatus of the patent document 1 consists of the valve seat, which is made of resin and provided in the downstream side of a flow control valve, and the metal diaphragm, which is located in the opposed position to the valve seat and clamped between a valve body and a screw type lid member.

The valve is closed by forcing metal diaphragms to the valve seat made of resin directly with the operation air supplied from air piping connected through the tube fitting screwed to the lid member.

According to this structure, there is no part such as a piston, and there is no factor that interrupts the returning movement of the metal diaphragm to the original form with its elasticity when operation air is exhausted. For this reason, it is not necessary to have a spring, etc., for assistance of opening a valve. That is, structure can be simple and there can be few parts as compared with the shutoff valve apparatus of a piston-cylinder actuator. This enables the shutoff valve apparatus to be miniaturized.

Moreover, the mass flow control device with built-in shutoff valve apparatus is indicated in the patent document 2, as shown in FIG. 10. FIG. 10 is a cross-section schematic view showing an example of the conventional mass flow control device with built-in shutoff valve apparatus. The same reference mark is given to the component part and the identical configuration portion in FIGS. 8, 9 and 10.

The structure indicated in FIG. 10 is fundamentally the same as the structure shown in the patent document 1, in the point of being built-in of the shutoff valve apparatus of a direct sealing type. The flow control valve mechanism 10 has the metal diaphragm 22 and the actuator 26 which presses and bends the above mentioned metal diaphragm 22. The valve aperture is changed to control the gas flow by making the above-mentioned diaphragm 22 approach or move away from the valve orifice 24. The shutoff valve apparatus 30 is located in the downstream side of the above-mentioned flow control valve mechanism 10, that is, in FIG. 10, the shutoff valve apparatus 30 is opposed to the lower part of the flow control valve mechanism 10, for example, is mounted on it bar screw junction.

This shutoff valve apparatus 30 has the valve chest 36 connected with the above-mentioned valve orifice 24 through the inlet flow path 34, and this valve chest 36 is divided by the metal diaphragm valve element 38 formed in the shape of a typically spherical shell.

The inlet port of the above-mentioned inlet flow path 34 facing this valve chest 36 is an inlet valve port 42, and the valve seat 44 is located in the portion of this inlet valve port 42. And from this valve chest 36, the outlet flow path 40 is extended toward semiconductor manufacturing device. On both sides of the above-mentioned diaphragm valve element 38, the operation chamber 46 is located in the opposite side of the above-mentioned valve chest 36, and the compressed operation air can be supplied to this operation chamber 46 by the electromagnetic three-way valve 48.

The inlet valve port 42 is closed by sitting the above-mentioned diaphragm valve element 38 on the valve seat 44, bending the diaphragm with the above-mentioned operation air supplied to the operation chamber 46. Thereby, the flow control valve mechanism 10 controls the mass flow rate of a gas and the shutoff valve apparatus 30 shuts off a gas flow completely. And, the capacity of the inlet flow path 34 connected from the flow control valve mechanism 10 to the shutoff valve apparatus 30, that is, the dead volume is much smaller than that of the gas piping 4A portion of the conventional device as shown in FIG. 9. Therefore, the capacity of the out-of-control gas can be decreased.

By the way, the device, which was disclosed by the above-mentioned patent documents 1 and 2, can be miniaturized in its size and also has the advantage that there is little processing gas to discard, since the shutoff valve apparatus was integrally incorporated in the mass flow control device as explained with reference to FIG. 10.

However, in the example of device as shown in the above-mentioned FIG. 10, since the pressure of operation air is uniformly applied to the whole metal diaphragm valve element 38 when the diaphragm valve element 38 of the shutoff valve apparatus 30 is operated, the high pressure of the operation air is required for deforming the metal diaphragm valve elements 38 to a closed valve state.

For example, when the gas flow at pressure 0.3 MPa is cut off, the operation air pressure of about 0.6 MPa is required, but the pressure of the operation air generally used at the manufacture factory for producing the semiconductor manufacturing device is the range of 0.4-0.7 MPa. For this reason, there was a problem that it will become difficult to realize the full closed state when the pressure of the operation air of factory is the range of 0.4-0.5 MPa. Since it is necessary to boost the operation pressure of shutoff valve apparatus to cut off the flow of high-pressure gas certainly as mentioned above, the inconvenience which is obliged to big repair in the facility of semiconductor manufacturing factory arises.

SUMMARY OF THE INVENTION

The present invention is originated paying attention to the above problems that this should be solved effectively. It is an object of the invention to provide a shutoff valve apparatus which can ensure the full closed operation even if it is compact, the dead volume is small, and the pressure of operation gas is low. Another object of the present invention is to provide a mass flow control device incorporating the shutoff valve apparatus.

In accordance with a first aspect of the present invention a shutoff valve apparatus comprising:

a valve block having a valve chest;

a flow input where fluid flows to the valve chest;

a flow output where fluid flows out of the valve chest;

a valve seat located in the valve port which consists of one of an inlet port of the flow input and an outlet port of the flow output;

a diaphragm valve element located in the opposed position of the valve seat so that the valve chest is divided, and closes the valve port by contacting with the valve seat;

a pressing means for pressing the diaphragm valve element;

an actuator plate which consists of an elastomer located at the opposite side of the valve chest so that the diaphragm valve element is opposed;

an operation chamber where it is divided with the actuator plate, and operation gas is supplied or exhausted there;

an operation gas supply exhaust mechanism in which the operation gas is made to supply or exhaust into the operation chamber.

Thus, in order to bend the diaphragm valve element which divides a valve chest reasonably by comparatively small power, the actuator plate which consists of elastomer, and the pressing means for pressing a diaphragm valve element were provided separately. And the operation chamber which this actuator plate divides is made to supply or exhaust operation gas, and the above-mentioned actuator plate is operated. By this, the central portion of the above-mentioned diaphragm valve element is bent by a pressing means, and the valve port is closed. As a result, it is small and there is little dead volume, moreover, even if the pressure of operation gas is low, the key point can be pressed certainly and the full closed operation with high sealing performance can be performed.

In this case, the pressing protrusion is provided between the central portion of the actuator plate and the central portion of the diaphragm valve element, for example, as specified in a second aspect.

Thus, by providing a pressing protrusion between the central part of an actuator plate and the central part of the above-mentioned diaphragm valve element, the lower pressure operation gas can also bend a diaphragm valve element easily, and can realize the full closed state.

Moreover, for example, said operation gas supply exhaust mechanism has an electromagnetic valve to supply or exhaust operation gas into or from said operation chamber as specified in third and fourth aspects.

Moreover, for example, the concavo-convex seal groove is formed on the surface which opposes the contacting surface of said actuator plate as specified in a fifth aspect.

In accordance with a sixth aspect of the present invention, an shutoff valve apparatus comprising:
  a valve block having a valve chest;
  a flow input where fluid flows to the valve chest;
  a flow output where fluid flows out of the valve chest;
  a valve seat located in the valve port which consists of one of an inlet port of the flow input and an outlet port of the flow output;
  a diaphragm valve element located in the opposed position of the valve seat so that the valve chest is divided, and closes the valve port by contacting with the valve seat;
  a diaphragm holder which presses down the perimeter of the diaphragm valve element air-tightly;
  an actuator plate which consists of an elastomer located at the opposite side of the valve chest so that the diaphragm valve element is opposed;
  a plate holder which presses down the perimeter of the actuator plate air-tightly;
  a pressing protrusion provided between the central portion of the actuator plate and the central portion of the diaphragm valve element;
  an operation chamber where it is divided with the actuator plate, and operation gas is supplied or exhausted there;
  a protrusion component for guidance made to project to the operation chamber side in the central portion of the actuator plate; and
  an operation gas supply exhaust mechanism having an electromagnetic valve which supplies or exhausts operation gas into or from the operation chamber.

In accordance with a seventh aspect of the present invention, a mass flow control device comprising:
  a mass flow rate detection means to detect the mass flow rate of the fluid which flows into a flow path, and to output a flow signal;
  a flow control valve mechanism which controls a mass flow rate when a valve drive signal changes the valve aperture;
  a control means to control the flow control valve mechanism based on the flow signal and a flow set-point signal inputted from the outside; and
  the shutoff valve apparatus according to the first, second, third, or fourth aspect of the present invention installed in the upper stream and/or downstream side of the flow path.

In accordance with a eighth aspect of the present invention, a mass flow control device comprising:
  a mass flow rate detection means to detect the mass flow rate of the fluid which flows into a flow path, and to output a flow signal;
  a flow control valve mechanism which controls a mass flow rate when a valve drive signal changes the valve aperture;
  a control means to control the flow control valve mechanism based on the flow signal and a flow set-point signal inputted from the outside; and
  the shutoff valve apparatus according to the fifth aspect of the present invention installed in the upper stream and/or downstream side of the flow path.

In accordance with a ninth aspect of the present invention, a mass flow control device comprising:
  a mass flow rate detection means to detect the mass flow rate of the fluid which flows into a flow path, and to output a flow signal;
  a flow control valve mechanism which controls a mass flow rate when a valve drive signal changes the valve aperture;
  a control means to control the flow control valve mechanism based on the flow signal and a flow set-point signal inputted from the outside; and
  the shutoff valve apparatus according to the sixth aspect of the present invention installed in the upper stream and/or downstream side of the flow path.

According to the present invention including the shutoff valve apparatus and the mass flow control device with the built-in shutoff valve, the beneficial action effect as follows can be exercised.

In order to bend the diaphragm valve element which divides a valve chest, the actuator plate which consists of elastomer is installed separately. The above mentioned actuator plate is operated by the operation gas which is supplied into or exhausted from the operation chamber which the actuator plate divides. The above-mentioned diaphragm valve element is pushed by the above mentioned actuator plate to be bent, then the valve port is closed. As a result, the shutoff valve apparatus can be small and have little dead volume, and moreover, even if the pressure of operation gas is low, the full closed operation can be ensured with high sealing performance.

BRIEF DESCRIPTION OF THE DRAWINGS

FIG. 7 is a figure showing the result of leak test of shutoff valve apparatus.

DETAILED DESCRIPTION OF THE INVENTION

One embodiment of the shutoff valve apparatus and the mass flow control device with built-in shutoff valve related to the present invention herein below is explained in full detail based on the accompanying drawings.

Figure 1:
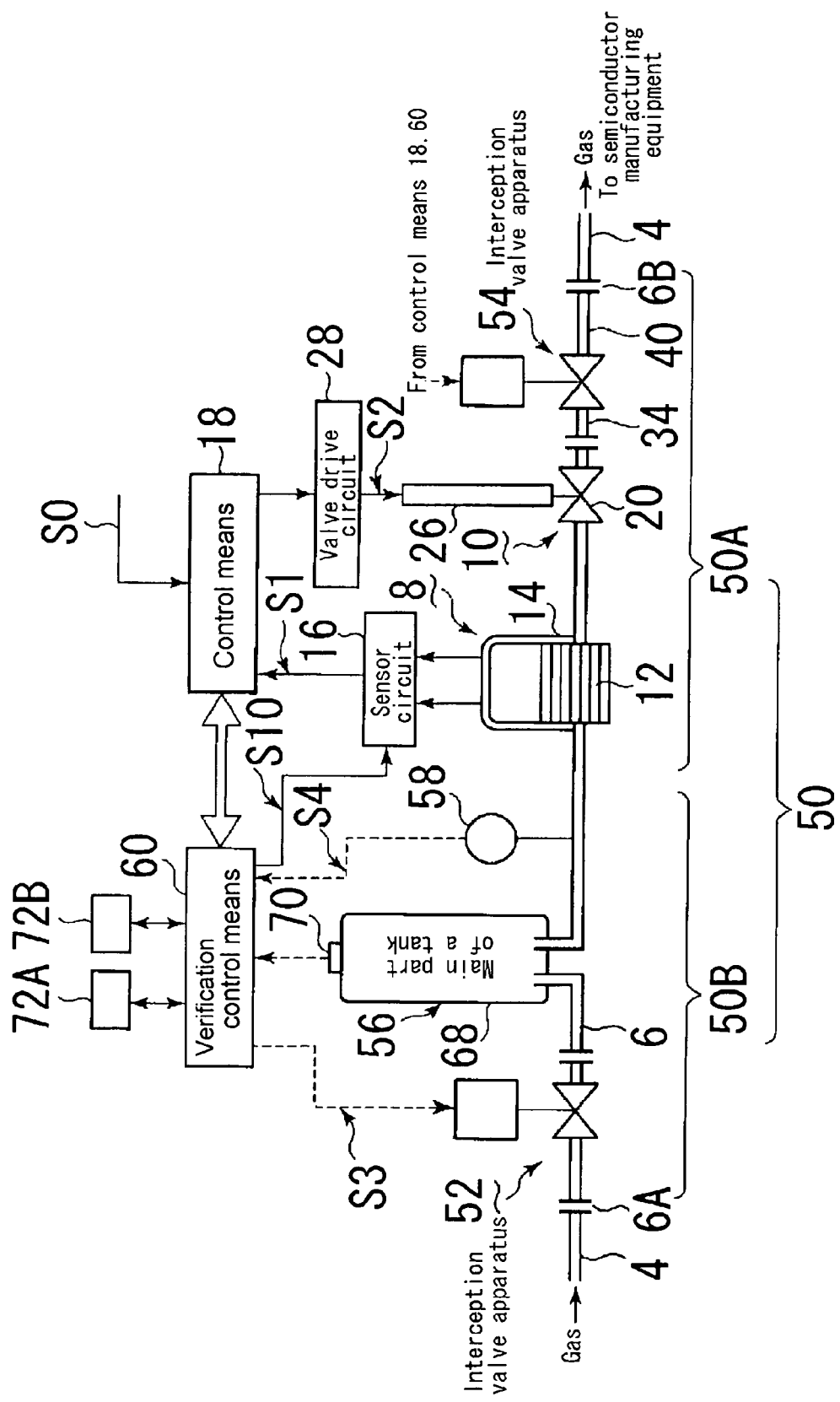
FIG. 1 is a block diagram showing an example of the mass flow control apparatus incorporating the shutoff valve apparatus.
Figure 2:
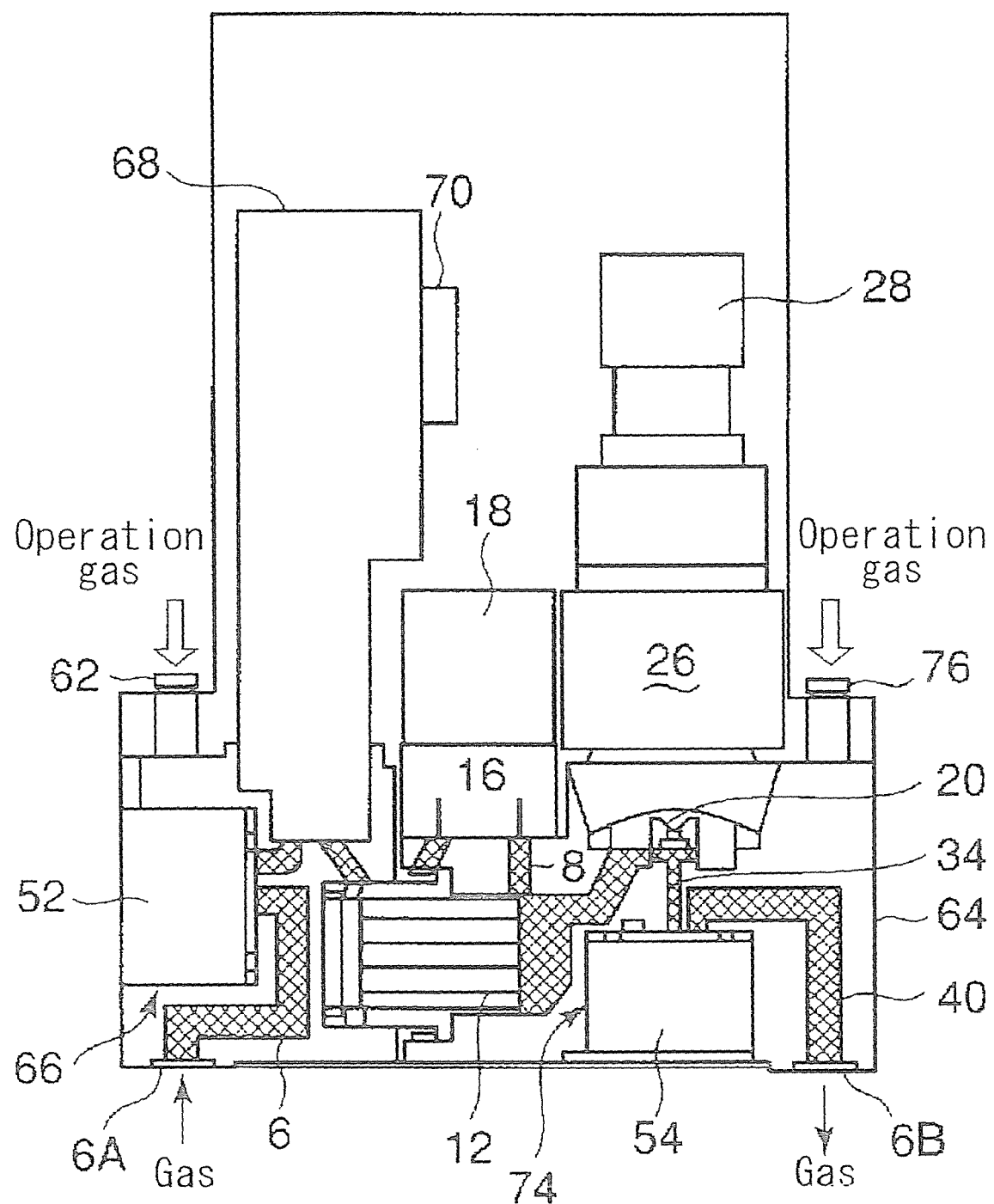
FIG. 2 is a layout drawing showing the arrangement of each component shown in FIG. 1.
Figure 3:
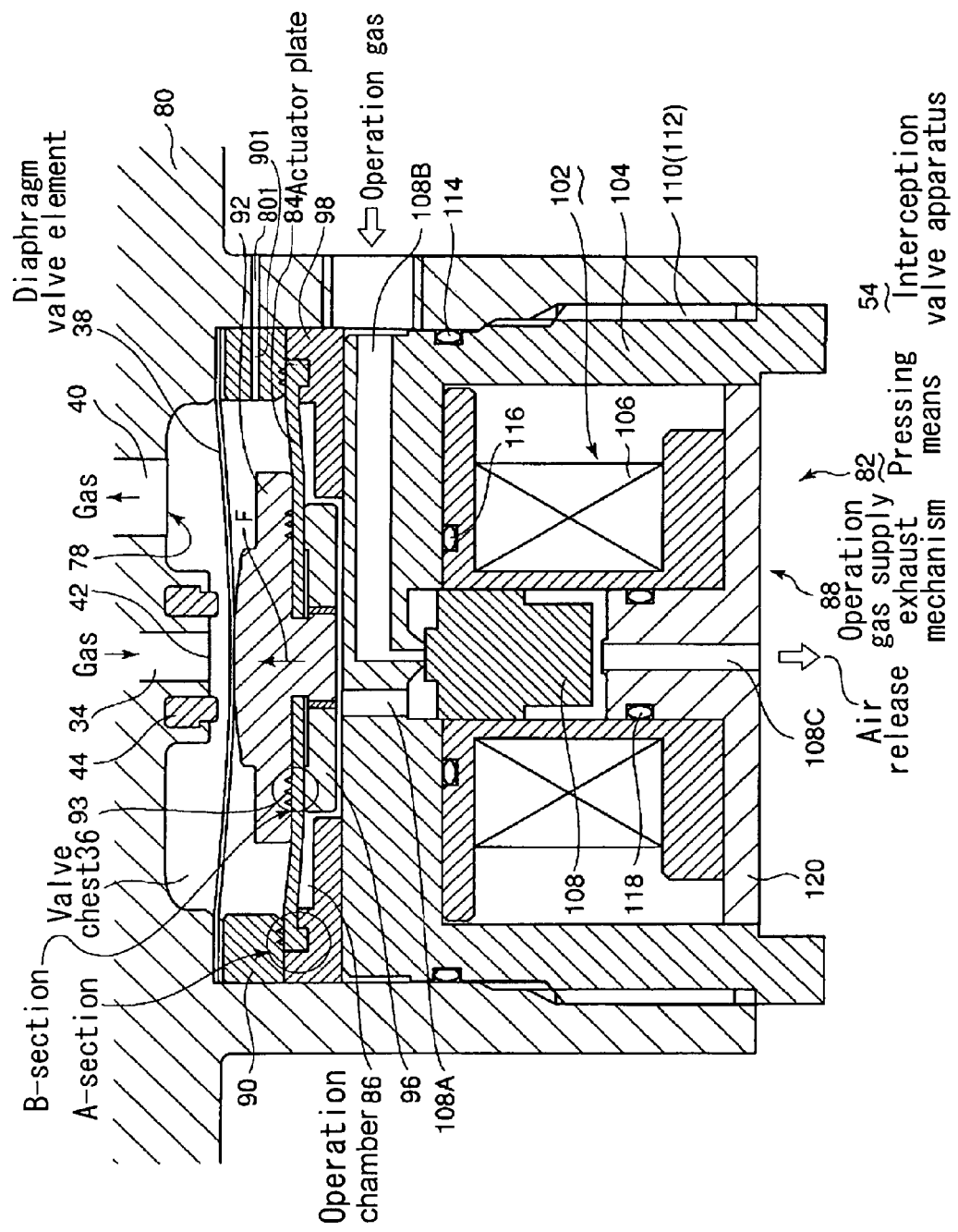
FIG. 3 is an expanded sectional view showing the shutoff valve apparatus related to the present invention.
Figure 4:
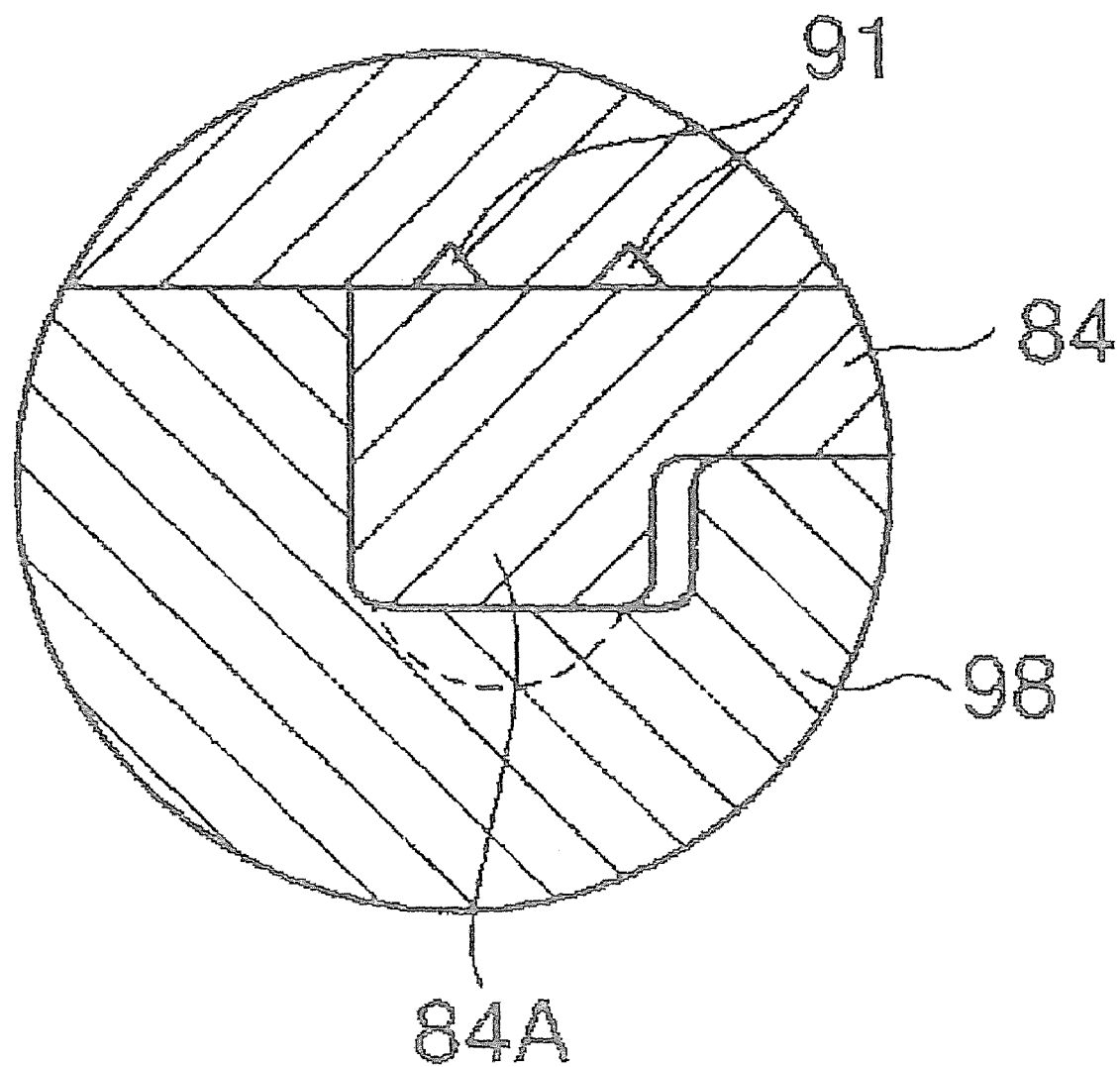
FIG. 4 is an enlarged view of the A section in FIG. 3.
Figure 5:
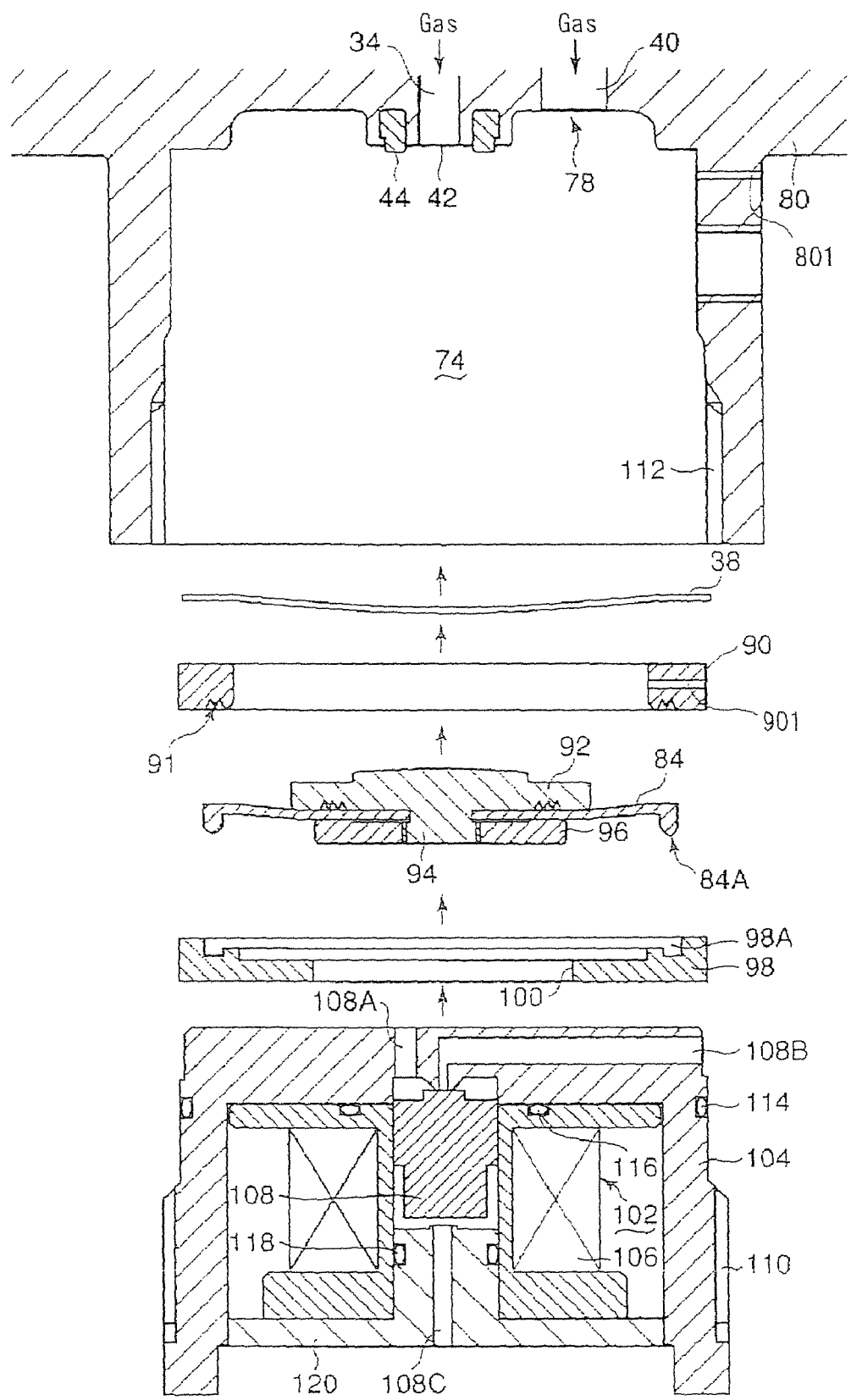
FIG. 5 is an exploded view of the shutoff valve apparatus.

FIG. 1 is a block diagram showing an example of the mass flow control device incorporating the shutoff valve apparatus; FIG. 2 is a layout drawing showing the arrangement of each component shown in FIG. 1; FIG. 3 is an expanded sectional view showing the shutoff valve apparatus related to the present invention; FIG. 4 is an enlarged view showing the A section in FIG. 3; and FIG. 5 is a exploded view of the shutoff valve apparatus.

Figure 8:
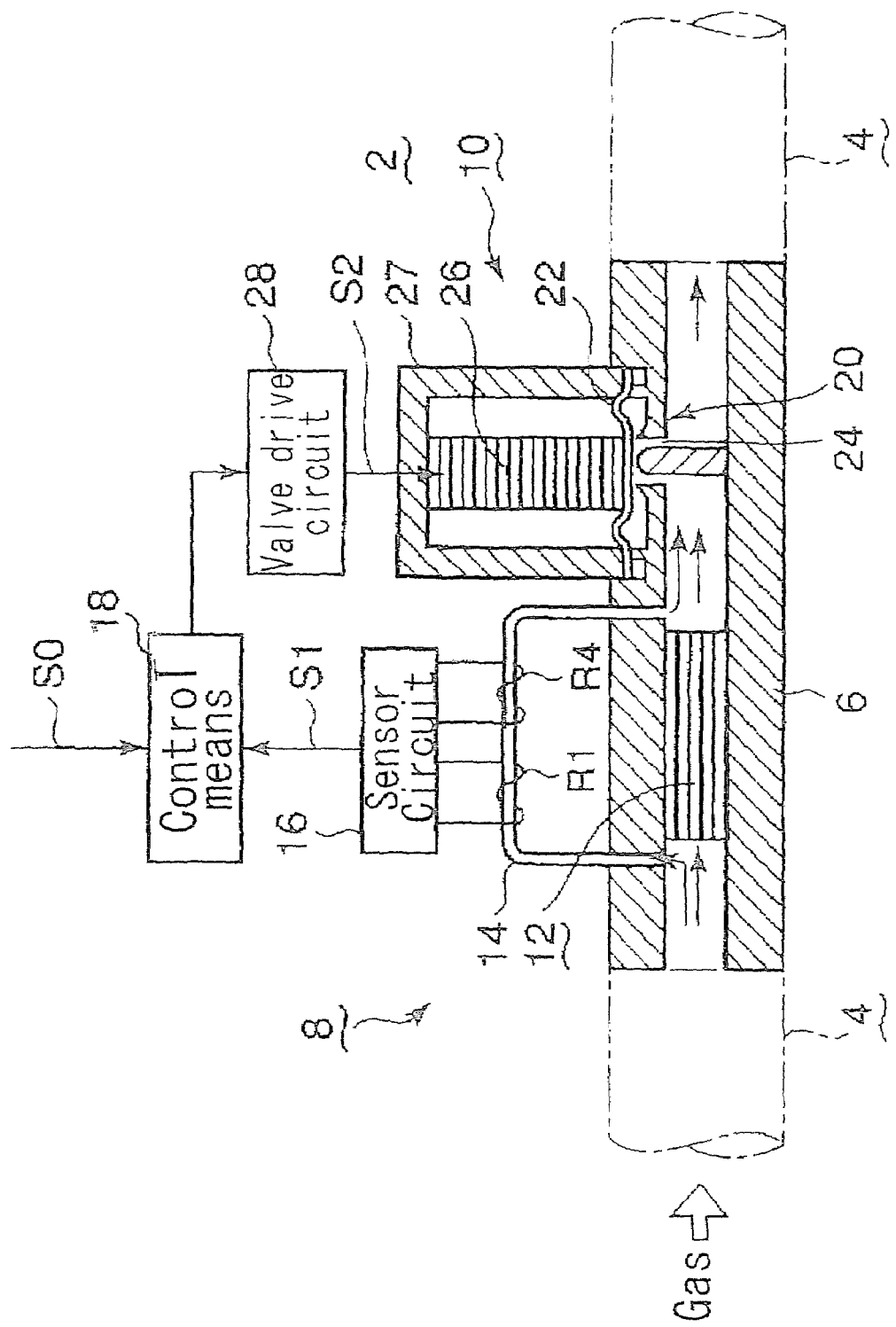
FIG. 8 is an outline composition figure showing an example of the conventional mass flow control device inserted in gas piping.
Figure 9:
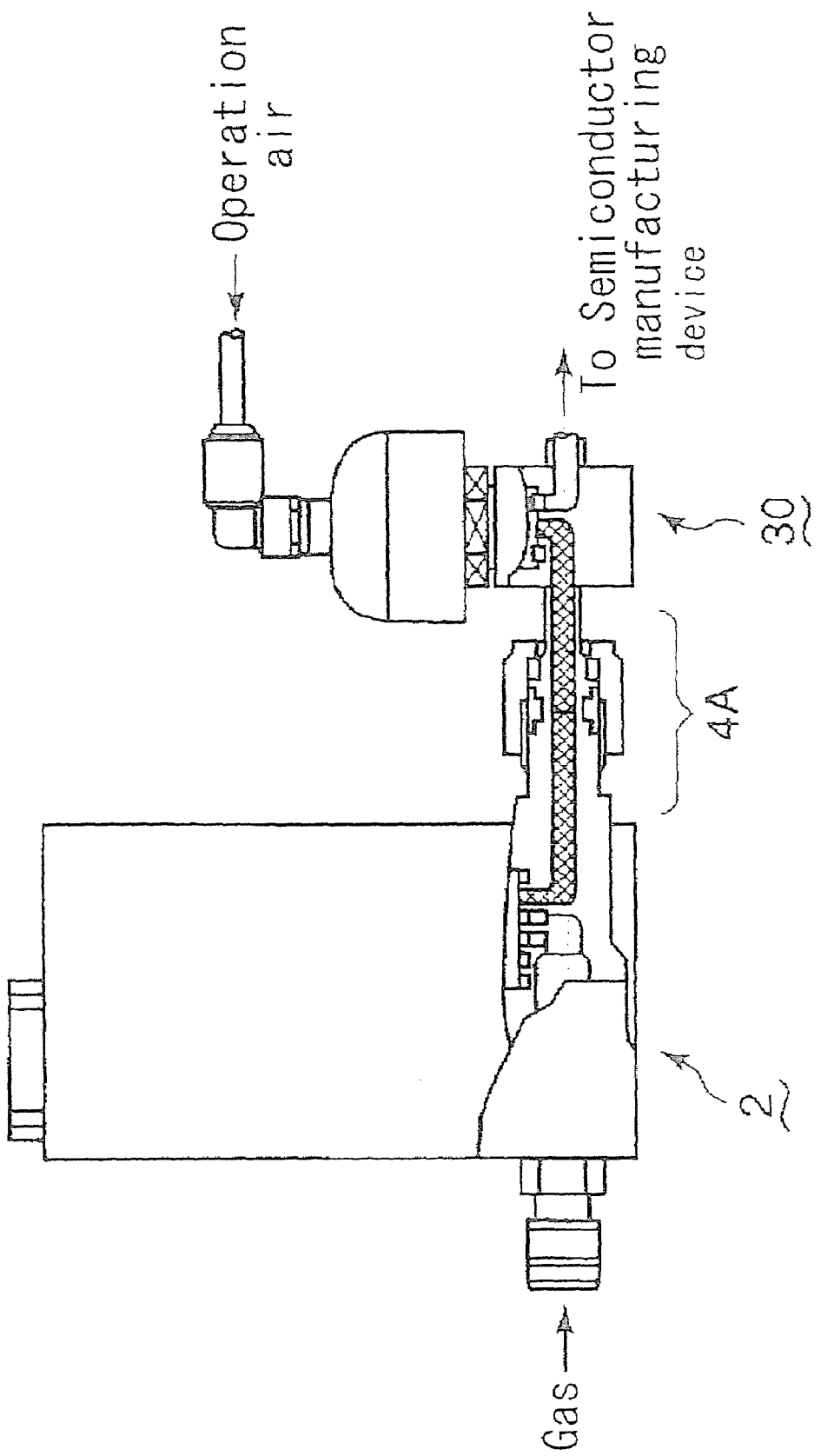
FIG. 9 is a figure showing an example of the conventional attachment form of mass flow control device and the separated shutoff valve apparatus.
Figure 10:
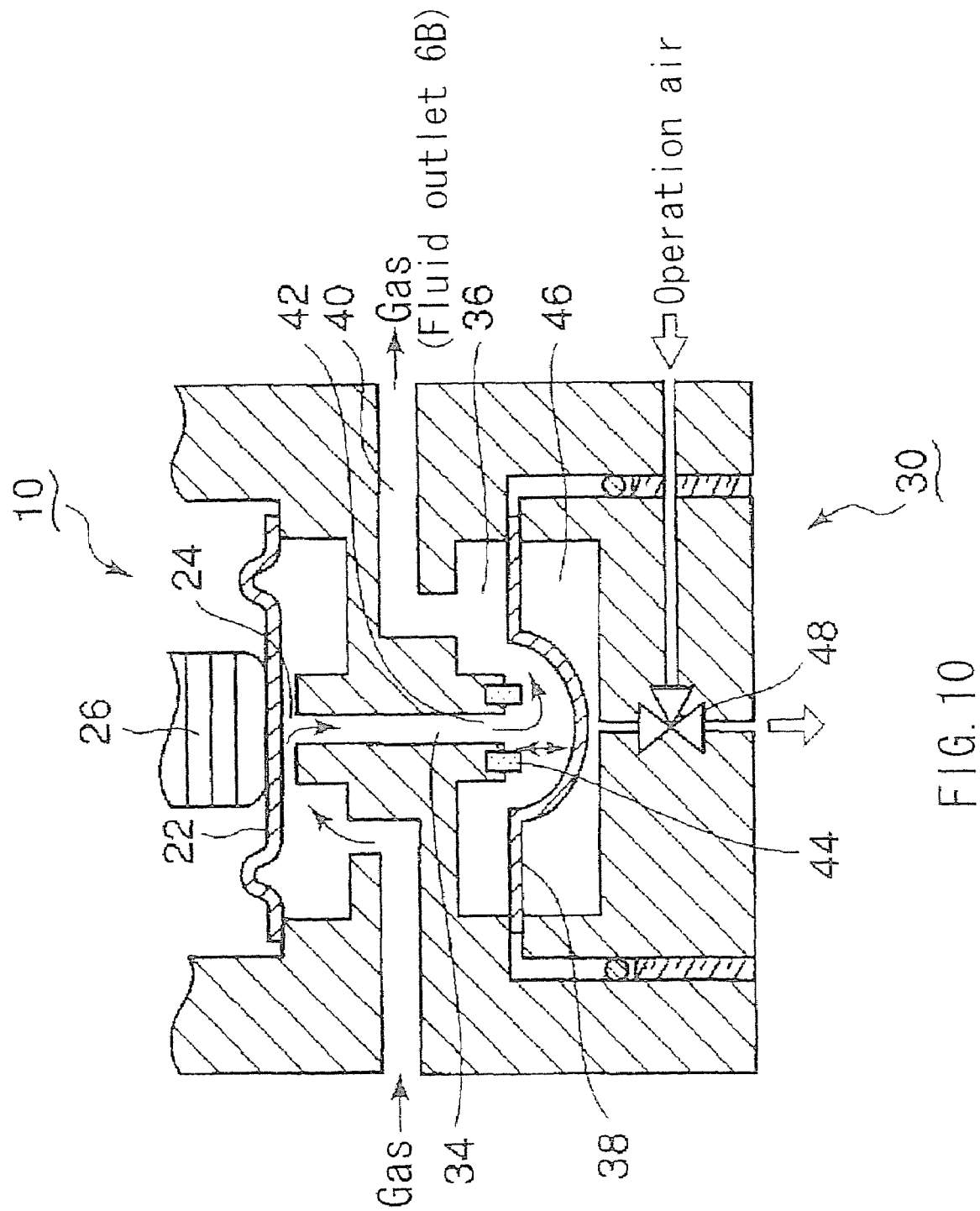
FIG. 10 is a cross section showing an example of the conventional mass flow control device with built-in shutoff valve apparatus.

In addition, the same referential characters are used to denote the same component parts and the identical configuration portion which were shown in FIGS. 8-10, and the explanation is omitted.

As illustrated, this mass flow control device 50 is inserted in the middle of the fluid path which passes fluid, such as a liquid and gas, for example, a gas piping 4, and controls this mass flow rate (it is also called only "flow" hereafter). In addition, the inside of the semiconductor manufacturing device connected to the end of this gas piping 4 is made into the vacua. This mass flow control device 50 comprises a mass flow rate control main unit 50 A and a verification main unit 50B which verifies a mass flow rate. This mass flow control device 50 has the flow path 6 formed, for example with stainless steel, etc., a fluid inlet 6A is connected to the upper stream side of the above-mentioned gas piping 4, and, specifically, the fluid outlet 6B is connected to the downstream side of the gas piping 4. And the shutoff valve apparatus 52 and 54 of the present invention is mounted on the upstream end and downstream end of this flow path 6 here, respectively. The composition of such shutoff valve apparatus 52 and 54 is mentioned later.

The above-mentioned mass flow control device 50A has the completely same conventional structure as device explained with reference to FIG. 8, for example, is equipped with the mass flow rate detection means 8, the flow control valve mechanism 10, and the control means 18 that consists of microcomputers, etc., here. The above-mentioned mass flow rate detection means 8 has the bypass assembly 12, the sensor tube 14, and the sensor circuit 16, etc., and outputs the flow signal S1 detected here to the above-mentioned control means 18. The above-mentioned flow control valve mechanism 10 has the flow control valve 20, the actuator 26 which drives the flow control valve 20, the valve drive circuit 28 which outputs the valve drive voltage S2 towards this actuator 26, etc.

And the above-mentioned control means 18 can control the valve aperture of the above-mentioned flow control valve 20 for example, by the PID controlling method so that the flow represented by the flow set-point signal S0 inputted, for example from the exteriors, such as a host computer, and the flow represented by the above-mentioned flow signal S1 are in agreement. In addition, in the example of illustration, although the above-mentioned flow control valve mechanism 10 is located in the downstream side of the above-mentioned mass flow rate detection means 8, it can be located in the upstream side of the above-mentioned mass flow rate detection means 8.

On the other hand, in the example of illustration, the above-mentioned verification main unit 50B is installed in the upstream side of the above-mentioned mass flow rate control main part 50A.

This verification main unit 50B is equipped with the above-mentioned shutoff valve apparatus 52 as a valve for verification which opens and closes this flow path 6 located in the above-mentioned flow path 6; a tank portion for verification 56 which has predetermined capacity; a pressure sensing means 58 to detect the pressure of the above-mentioned gas which is fluid, and to output a pressure sensing signal; and a verification control means 60 which control comprises, for example, microcomputers, etc., so that mass flow rate verification operation is performed using the shutoff valve apparatus 52 which is the above-mentioned valve for verification, the above-mentioned tank part for verification 56, and the above-mentioned pressure sensing means 58.

The shutoff valve apparatus 52 for the above-mentioned verification is provided in the upstream side end of the flow path 6 in the verification main unit 50B, is opened and closed by the tank valve switching signal S3 which is the instructions from the above-mentioned verification control means 60, and, specifically, can intercept the flow path 6 if needed. As explained later, for example, a miniature valve device without an actuator which contains the electromagnetic three-way valve and the diaphragm for a full closed operation can be used as shutoff valve apparatus 52 for the above-mentioned verification.

This miniature valve device without an actuator bends a diaphragm valve element for a full closed operation with the operation gas introduced from the operation gas inlet 62 (refer to FIG. 2), and realizes alternatively the full open state of a valve port and the full closed state sealed completely. The shutoff valve apparatus 54 of another side of this structure is also the same. In FIG. 2, the shutoff valve apparatus 52 for the above-mentioned verification is installed in the female attachment 66 formed in the removable device cabinet 64. Moreover, the above-mentioned pressure sensing means 58, which comprises, for example, a capacitance manometer, detects the pressure of the gas in the above-mentioned flow path 6, and can output it towards the above-mentioned verification control means 60 by making this detection value into the pressure signal S4.

Moreover, the above-mentioned tank part for verification 56 comprises a main part of a tank 68 which is formed of stainless steel etc., for example, and is provided between the shutoff valve apparatus 52 for the above-mentioned verification, and the pressure sensing means 58.

This main part of a tank 68 is set to predetermined volume, for example, the capacity of about 40 cm$^3$, and the flowing gas certainly passes through the inside of this main part 68 of a tank. Moreover, near the above-mentioned main part 68 of a tank, for example, the platinum resistance-temperature detector is attached to the upper surface of the ceiling section of the main part 68 of a tank as a temperature detection means 70, and the signal which shows the temperature detected here can be inputted into the above-mentioned verification control means 60.

Moreover, the standard data memory 72A and the verification data memory 72B are connected to the above-mentioned verification control means 60.

The standard data memory 72A memorizes the pressure change (standard pressure change) used as the standard of the gas stream when performing verification operation of a flow, and the verification data memory 72B memorizes the pressure change of the gas stream acquired when performing verification operation of a flow.

And this verification control means 60 outputs the calibration signal S10 towards the sensor circuit 16 of the above-mentioned mass flow rate detection means 8, if needed, and can properly calibrate this sensor circuit 16 based on a calibration result.

Moreover, this verification control means 60 and the control means 18 of the above-mentioned mass flow rate control main unit 50A interlock, if needed.

Moreover, as shown also in FIG. 2, the shutoff valve apparatus 54 of the other side located at the downstream side forms the female attachment 74 in the undersurface side of the device cabinet 64, and incorporates the above-mentioned shutoff valve apparatus 54 in this female attachment 74. This female attachment 74 is arranged in the position which counters to the flow control valve 20 of the above-mentioned flow control valve mechanism 10. Moreover, the operation gas which drives this shutoff valve apparatus 54 can be introduced from the operation gas inlet 76.

Next, the composition of the above-mentioned shutoff valve apparatus 52 and 54 is explained in detail. As mentioned above, the shutoff valve apparatus 52 on the upstream side is a valve gear used when the mass flow control device 50 verifies whether control of flow can be performed with sufficient accuracy. Moreover, the shutoff valve apparatus 54 on the downstream side is a valve gear used when performing zero adjustment of the mass flow control device 50, or when it is necessary to intercept completely the gas passed to the semiconductor manufacturing device side.

Here, since the two above-mentioned shutoff valve apparatuses 52 and 54 have the completely same composition, an explanation will be made taking the case of the shutoff valve apparatus 54 on the downstream side.

The above-mentioned shutoff valve apparatus 54 on the downstream side has the valve chest 36 to accumulate the gas inside temporally, the inlet flow path 34 which makes the gas of control fluid flow into the valve chest 36, and the outlet flow path 40 into which gas is made to flow out of the valve chest 36, as shown in FIGS. 2, 3, and 9.

The upper end portion of the above-mentioned inlet flow path 34 is directly connected to the valve orifice 24 (refer to FIG. 10) of the above-mentioned flow control valve mechanism 10, or the upper end portion of the above-mentioned inlet flow path 34 forms another flow path. As a result, the inlet valve port which is a lower end portion of this inlet flow path 34 is the inlet valve port 42 of this shutoff valve apparatus 54. The ring shaped valve seat 44 which consists of fluororesins (PTFE, PCTFE, etc.) is provided with a slight projection to the direction of a tip in the end of the inlet valve port 42 project (lower end in FIG. 10). In addition, the valve seat 44 can be a metal valve seat formed by machining valve orifice 24 portion.

And the above-mentioned outlet flow path 40 expands from outlet valve port 78 facing the valve chest 36 and the tip part is constituted as the fluid outlet 6B (refer to FIG. 1). The above-mentioned inlet flow path 34, the outlet flow path 40, and the valve chest 36 can be formed into the valve block 80 by machining a hole and a female attachment 74 (see FIG. 5) in the block which consists of stainless steel, for example. The valve block object 80 is mutually used with the side of the flow control valve 20 in the above-mentioned flow control valve mechanism 10.

The above-mentioned valve chest 36 is formed so that it is located in the very bottom (the inside of FIGS. 3 and 5 most upper part) of the above-mentioned attachment female 74, and the lower part of this valve chest 36 is air-tightly divided by the metal diaphragm valve element 38 which is able to bend.

And the pressing means 82 for pressing this diaphragm valve element 38, and opening and closing the above-mentioned inlet valve port 42 is provided in the opposite side in the above-mentioned valve chest 36 of this diaphragm valve element 38.

This pressing means 82 is mainly equipped with an actuator board or plate 84 which comprises an elastomer disposed in the opposite position to the above-mentioned valve chest 36, which opposes the above-mentioned diaphragm valve element 38; an operation room or chamber 86, which is divided with this actuator plate 84 and the operation gas is supplied or exhausted; and the operation gas supply or exhaust mechanism 88, which supply or exhaust the operation gas into or from this operation chamber 86.

As specifically shown also in FIG. 5, the above-mentioned diaphragm valve element 38 comprises a metal disc about 0.1 mm thick which can be bent and the cross-section curves circularly, is formed. The diameter of this diaphragm valve element 38 is set, for example, at about 22 mm. This diaphragm valve element 38 is located in the innermost of the female attachment 74 and its peripheral part is held down for air-tightness by the diaphragm holder 90 formed in the shape of a ring, for example, which is made of stainless steel. And in the surface on the side opposite with the surface which touches the above-mentioned diaphragm valve element 38 of the diaphragm holder 90, a plurality of grooves 91 which cross-sectional form is a triangle and were formed in concavo-convex as shown in FIG. 4, for example, two seal grooves, are formed in the shape of a ring along the direction of a circumference. And the sealing performance of the portion is improved by pressing the actuator plate 84 against the seal groove.

Moreover, the actuator plate 84 comprises an elastomer in the shape of a disc about 0.4 mm thick for example, and the engaging-of-clutch protrusion 84A is formed in the circumference part in the shape of a ring. As this elastomer, crude rubber and the synthetic rubber can be used, for example, ethylene propylene rubber, butyl rubber urethane rubber, silicone rubber, a chlorosulfonation rubber, chlorinated polyethylene rubber, acrylic rubber, etc. can be used.

Moreover, the disc-shaped pressing protrusion 92 is inserted between the central portion of the above-mentioned actuator plate 84, and the central portion of the above-mentioned diaphragm valve element 38. In the example of illustration, this disc-shaped pressing protrusion 92 comprises brass or stainless steel, is formed in the shape of a button as a protrusion in the shape of a disc about 10 mm in diameter, and is being mounted and fixed to the above-mentioned actuator plate 84 side.

Specifically, a protrusion screw 94 is provided in the center of this pressing protrusion 92, the protrusion screw 94 penetrates the center of the actuator plate 84, and projects to the opposite side. And the button holder 96 as a protrusion component for guidance in the shape of a disc which has a screw hole into a central portion at the opposite side is bound tight on the above-mentioned protrusion screw 94. The above-mentioned pressing protrusion 92 is mounted and fixed by this.

And in the surface where this pressing protrusion 92 contacts the above-mentioned actuator plate 84, as shown in the B section in FIG. 3, a number of seal (grooves 91 which has the similar cross-sectional form with a triangle of concavo-convex shown in FIG. 4. for example, 2 seal grooves are formed in the shape of a ring along the direction of a circumference. The sealing performance of the portion can be highly maintained.

And the peripheral part of the actuator plate 84 formed in this way is pressed by the plate holder 98 of the shape of a ring which comprises stainless steel, for example. Under the present circumstances, the female portion 98A for inserting the engaging-of-clutch protrusion 84 A of the above-mentioned actuator plate 84 in the above-mentioned plate holder 98 is formed. And when it is assembled and equipped, as shown in FIG. 4. the hemispherical tip portion of the above-mentioned engaging-of-clutch protrusion 84A is crushed, and the sealing performance of this portion can be highly maintained. In addition, the shape of the engaging protrusion 84A before crushing is indicated as a chain line shown in FIG. 4.

Moreover, the stage portion 100 for a guide of the size which can accommodate the above-mentioned button holder 96 is formed in the central portion of this plate holder 98. And there is an about 0.1 mm clearance between the circumference of the stage portion 100 for a guide and the above-mentioned button holder 96. By this, when the above-mentioned actuator plate 84 elastically moves in the direction of the valve chest 36, it can guide so that a linear stroke movement is performed. The above-mentioned actuator plate 84 divides the one side of an operation chamber, i.e., the one side of a valve chest, here. Moreover, the space by the side of the valve chest 36 divided by the diaphragm valve element 38 and opposite, i.e., the space between the diaphragm valve element 38 and the actuator plate 84, is connected to the atmosphere by the ventilation ways 801 and 901. As a result, when a compressed air enters that space, movement of the actuator plate 84 is not blocked.

Moreover, the above-mentioned operation gas supply exhaust mechanism 88 is mainly constituted by the electromagnetic valve 102 and the casing 104 of the shape of a cylinder object which covers the circumference. As an electromagnetic valve 102 accommodated in the above-mentioned casing 104, a three-way electromagnetic valve is provided here, and the three-way valve body 108 can be activated with the solenoid 106. The first gas inlet of the above-mentioned three-way valve body 108 is connected into the above-mentioned operation chamber 86 through the flow path 108A formed in casing 104, the second outlet is connected to the operation gas inlet 76 (refer to FIG. 2) through the flow path 108B formed in casing 104, and the third gas inlet is connected to the atmosphere side through the flow path 108C and 108C here. The power source of the electromagnetic valve 102 is supplied from the control means 18, and control of turning on electricity is performed by the control means 18 here. That is, at the time of turning off electricity, a valve body 108 is pushed in the direction which closes opening of the flow path 108B by the means of a spring (not shown) etc., and the valve closes. At this time, the flow path 108A and the flow path 108C are connected, and operation gas does not flow into the operation chamber 86. On the other hand at the time of turning on electricity, a valve body 108 moves in the direction which pushes back a spring by the electromagnetic power which the electromagnetic valve 102 generates, and it is pushed in the direction which closes the opening of the flow path 108C, and the valve closes. At this time, the flow path 108A and the flow path 108B are connected, and operation gas flows into the operation chamber 86.

The external thread 110 is formed in the perimeter of the above-mentioned casing 104, this external thread is inserted in the internal thread 112 (refer to FIG. 5) formed at the tip of the inner surface of the above-mentioned female attachment 74, and casing 104 is bound tight toward the back. By this, each above-mentioned component can be pressed, mounted and fixed towards the valve-chest 36 side.

Moreover, between the wall of this female attachment 74 and the above-mentioned casing 104, the sealing component 114 such as O-ring, and air-tightness is held. Moreover, the sealing component 116 such as O-ring is provided also between casing 104 and the electromagnetic valve 102 provided in this inner side, and air-tightness is held. Furthermore, the sealing component 118 such as O-ring is provided also in the lid component 120 which covers the three-way valve body 108 of the above-mentioned electromagnetic valve 102 between the above-mentioned electromagnetic valves 102, and the air-tightness of this portion is held.

The upper end face of the above-mentioned casing 104 (refer to FIG. 3) is the division wall which is in the opposite side of the above-mentioned operation chamber 86. And operation gas is supplied into the operation chamber 86 through the above-mentioned flow path 108A if needed, and it has come to be able to carry out the air release of the operation gas in this operation chamber 86 through the above-mentioned flow path 108C by changing the above-mentioned three-way valve body 108.

Next, operation of the mass flow control device of the present invention and shutoff valve apparatus constituted as mentioned above is explained.

The operation of this mass flow control device 50 has two kinds, the normal operation mode in which the mass flow control device 50 controls the processing gas flow to the semiconductor manufacturing device, etc., and the verification operation mode which performs operation about verifying of a mass flow rate. Normal operation mode is explained. This is the same as operation previously explained with reference to FIG. 8, and operation by the side of the verification main unit 50B has become a resting state in this case. That is, control means 18 of the above-mentioned mass flow rate control main unit 50A continues controlling the degree of valve-opening of the above-mentioned flow control valve 20, for example, by the PID controlling method so that the flow represented by flow set-point signal S0 inputted from the exteriors such as a host computer, and the flow represented by the above-mentioned flow signal S1 are in agreement. Thereby, the processing gas of the desired mass flow is supplied to the semiconductor manufacturing device, etc., in the downstream side.

When the processing gas flows, the shutoff valve apparatus 54 at the most downstream end (the shutoff valve apparatus 52 at the most upstream end as well) is open. Therefore, in FIG. 3. the gas which passed flow control valve 20 flows through the inside of inlet flow path 34 of shutoff valve apparatus 54, and flows out of the inlet valve port 42 into the valve chest 36. And the processing gas flows being temporarily accumulated into the valve chest 36, and flows out and goes to the outlet flow path 40 side through the outlet valve port 78. Furthermore, it flows and goes towards semiconductor manufacturing device through the gas piping 4 from the fluid outlet 6B (refer to FIG. 1).

In this case, the necessity of complete shutoff of processing gas supply arises frequently depending on the operation state of the semiconductor manufacturing device which is a usage system of processing gas. In such a case, the shutoff valve apparatus 54 attached in the downstream side end of this mass flow control device 50 is operated and fully closed, and the flow of processing gas is stopped completely.

Specifically, as mentioned above, by operating the electromagnetic valve 102 of the three-way valve as the operation gas supply exhaust mechanism 88 in this shutoff valve apparatus 54, the operation gas (specifically operation air) from the factory currently supplied to this shutoff valve apparatus 54 in the range of pressure 0.4 MPa-0.7 MPa is introduced into the operation chamber 86 through the flow path 108 B, the three-way valve body 108, and the flow path 108A. When the above-mentioned operation gas is introduced into this operation chamber 86, the actuator plate 84 made of rubber which divides this operation chamber 86 will be bent and deformed elastically so that it goes upward in FIG. 3, and then the power F to the diaphragm valve element 38 side is generated.

Here, since the tip part of the pressing protrusion 92 formed in the central portion of the above-mentioned diaphragm valve element 38 and the central portion of the actuator plate 84 are always contacted, the central portion of the above-mentioned diaphragm valve element 38 is intensively pressed by the above-mentioned pressing protrusion 92. As a result, the above-mentioned diaphragm valve element 38 can be bent and deformed easily, this can be contacted with the valve seat 44, the inlet valve port 42 can be closed completely, and the flow of processing gas can be intercepted completely. As a result of the experiment mentioned later, even when the pressure of the operation gas supplied from the exterior was 0.35 MPa, the opening-and-closing operation of this shutoff valve apparatus 54 could be ensured.

In passing processing gas again after shutoff of this processing gas, as mentioned above, by the activation of the above-mentioned electromagnetic valve 102 the three-way valve body 108 is operated, and then the pressurized operation gas in the above-mentioned operation chamber 86 flows out to the atmosphere through the flow path 108C. Thereby, by the elastic repulsion force of the above-mentioned actuator plate 84, and the elastic repulsion force of the above-mentioned diaphragm valve element 38, the above-mentioned actuator plate 84 is separated from the valve seat 44, returns to the original position (normally open state), and opens this inlet valve port 42.

Thus, in order to bend the diaphragm valve element 38 which divides the valve chest 36, the actuator plate 84 made of elastomer is provided separately.

The actuator plate 84 is moved by the operation gas which is supplied into or exhausted from the operation chamber 86 which is divided by the actuator plate 84.

By the movement of the above-mentioned actuator plate 84, the above-mentioned diaphragm valve element 38 is bent, then the inlet valve port 42 is closed, the full closed operation can be ensured in case that the dead volume is little by the small type and even the pressure of the operation gas is low.

Moreover, since the flow of a dead space uncontrollable by the flow control valve mechanism 10 is only the capacity of the inlet flow path 34, the dead space can be highly decreased. Therefore, since the waste of processing gas can be decreased significantly and the discard time of the processing gas can also be shortened, a throughput can be raised by the shortening.

Moreover, since the three-way electromagnetic valve 102 is very small, the device itself can be miniaturized, for example. And the bottom side of this mass flow control device itself can be formed in less concavo-convex or no concavo-convex flat form. As a result, the generality of mounting on integrated gas system can be improved. For example, the height of the whole shutoff valve apparatus 54 of this embodiment is about 18 mm, and was able to be remarkably miniaturized as compared with conventional device. And, the amount of strokes of the above-mentioned actuator plate 84 is about 1 mm or less, for example, 0.4 mm, and can perform opening-and-closing operation in a very small amount of strokes.

Figure 6A:
FIG. 6A is an illustration for explaining a deformation of a diaphragm valve element by the pressure of the operation gas in a conventional device.
Figure 6B:
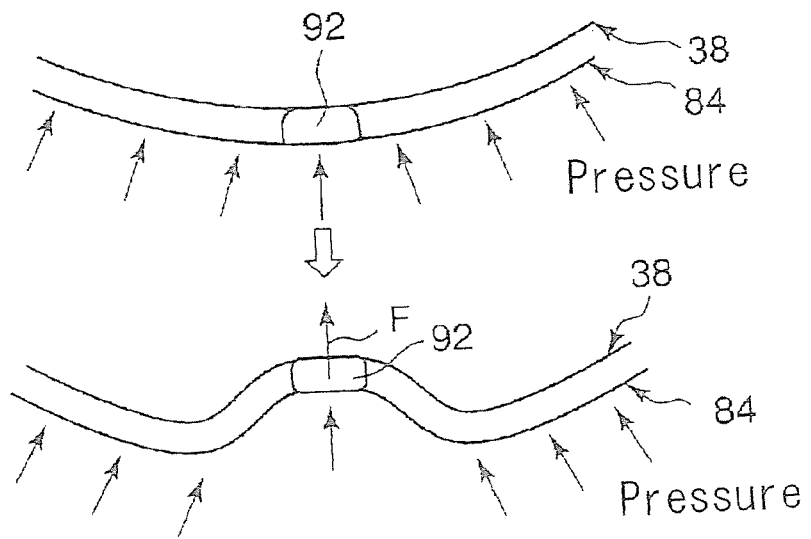
FIG. 6B is an illustration for explaining a deformation of a diaphragm valve element by the pressure of the operation gas in this invention device.

With reference to FIG. 6, even if the pressure of operation gas is low, the reason why the diaphragm valve element 38 can bend and operate is explained. FIG. 6 is a diagram for explaining a situation that the diaphragm valve element 38 bends and deforms with the pressure of the operation gas. FIG. 6A shows operation of the diaphragm valve element 38 (refer to FIG. 10) in conventional device, and FIG. 6B shows operation of the diaphragm valve element 38 in this invention device.

Since the pressure of operation gas is uniformly applied all over the diaphragm valve element 38 in the case of the conventional device shown in FIG. 6A, consequently the pressure is uniformly applied to the cross-sectional arch form of the diaphragm valve element 38 with big tolerance to deformation, and then the deformation cannot be induced easily.

On the other hand, in the present invention, the pressure of operation gas is applied to the rubber actuator plate 84, and only the portion which contacts the pressing protrusion 92 of the central part presses the diaphragm valve element 38. As a result, the diaphragm valve element 38 is easily bent by partial concentration force.

And when bend and deformation are generated in this part, this deformation will spread in a circumference part, and, finally the whole diaphragm valve element 38 will be bent and deformed.

The evaluation result of the operation condition for the shutoff valve apparatus 54 of the present invention mentioned above is explained hereafter. The plate thickness of the diaphragm valve element 38 under test is 0.11 mm, and height is 0.48 mm. Nitrogen is used as the operation gas, and its pressure is changed from 0.20 MPa to 0.80 MPa. As a result, in the state of setting operation gas pressure to 0.20 MPa-0.30 MPa, the diaphragm valve element 38 could not be bent and deformed, and opening-and-closing operation was not able to be performed. On the other hand, in the state of setting operation gas pressure to 0.35 MPa-0.80 MPa, it has checked that the diaphragm valve element 38 could be bent and deformed, and could perfectly perform the opening-and-closing operation. Therefore, in the state of 0.4 MPa to 0.7 MPa which is the operation gas pressure of the general factory area in which semiconductor manufacturing device are installed, it has checked that opening-and-closing operation of the shutoff valve apparatus 54 of the present invention could be carried out certainly.

Next, the evaluation result of the leak test of the shutoff valve apparatus 54 of the present invention mentioned above is explained. FIG. 7 is a figure showing the result of leak test of shutoff valve apparatus. The diaphragm valve element 38 here is the same as what was used by the evaluation of the previous situation of operation, plate thickness is 0.11 mm and height is 0.48 mm. The leak was checked after 0-2000K ($K=10^3$) times of opening-and-closing operation at 2 seconds interval. Helium gas was used for the leak check. Using the valve of CV value 0.07, which shows the ease of the fluid flow, the external and seat leak were determined in case that the pressure of the operation gas is set as 0.40 MPa.

External leak means the leak from the device of the shutoff valve apparatus 54 itself, and seat leak means the leak from diaphragm valve element 38 portion of full closed states. "B.G." shown in FIG. 7 means the background value of the helium leak detector, the leak test was performed for 3 minutes after an inspection start. The leak test using helium gas here is based on a vacuum method, makes a vacua inside of a valve which is a subject of examination, and when helium gas is sprayed on this valve, the quantity of helium gas inhaled from outside to inside is determined. Therefore, when there is no leak, the numerical value that shows helium leak detector after examination is smaller than that before examination.

The difference of the measurements 3 minutes after a test start and a background is made into the leak value as shown in FIG. 7. That is, the value which subtracted the value of the background from the value 3 minutes after an inspection start was made into the leak value.

As a result, each amount of external leaks was a value sufficiently smaller than $1.0 \times 10^{-11}$ Pa m³/s which is the upper limit of an acceptability criterion, and the amount of seat leak was also a value sufficiently smaller than $5.0 \times 10^{-8}$ Pa m³/s which is the upper limit of an acceptability criterion. And even if the number of times of opening and closing increased, the amount of both leaks are smaller than the leak inspecting standard (upper limit), and all judgment and result confirmed the normality, until after carrying out opening-and-closing operation $2 \times 10^6$ times.

In addition, the closed operation of the above-mentioned shutoff valve apparatus 54 is also performed at the zero adjustment of this mass flow control device. For example, by fully closing the shutoff valve apparatus 54, the gas flow through the flow control valve 20 is completely shutoff. Zero of the mass flow detection means 8 is calibrated using the detected flow rate at this condition.

Next, verification operation mode is explained briefly.

When performing verification operation which verifies the flow measurement value of the above-mentioned mass flow control device and calibrates the flow if needed, the shutoff valve apparatus 54 at the side of a downstream will chance into an open state, and the shutoff valve apparatus 52 at the side of the upper stream will change into a closed state. This opening-and-closing operation and procedure of these shutoff valve apparatus is the same as the opening-and-closing operation previously explained in the case of the shutoff valve apparatus 54 at the side of a downstream.

First, the semiconductor manufacturing device side is continuously made into a vacuum, and the shutoff valve apparatus 52 by the side of the upper stream is changed into a perfect closed state in the state where a constant rate of gas is stably passed by a certain predetermined flow. Then, the gas filled in the main part 68 of a tank of the tank part 56 for verification flows out and goes to the downstream side little by little from the inside of this main part 68 of a tank, and pressure declines to the base pressure of a vacua eventually. Change of the pressure at this time is measured by the pressure sensing means 58, and the change characteristic, i.e., the pressure-drop characteristic, is acquired.

The pressure-drop characteristic is measured at various flow set-point and is memorized in the data memory 72B for verification. And the pressure-drop characteristic acquired at each set-point is compared with each pressure-drop characteristic for standards, respectively. Each pressure-drop characteristic for standards is acquired beforehand, and is memorized by the data memory 72A for standards. And the difference will be calibrated.

In addition, the above-mentioned shutoff valve apparatus 52 and 54 is explained by using the example case for a three-way valve-type electromagnetic valve used as an electromagnetic valve 102, but it is not limited to this but the electromagnetic valve more than a two-way valve or a four-way valve may be used. Moreover, in using a two-way valve-type electromagnetic valve, it controls supply exhaust of operation gas by an external control system.

Moreover, although the pressing protrusion 92 formed between the diaphragm valve element 38 and the actuator plate 84 was mounted and fixed to the actuator plate 84 side, without limitation to this embodiment, pressing protrusion 92 is adhered on the diaphragm valve element 38 side with adhesives or the like.

Furthermore, although the valve seat 44 was provided at the inlet valve port 42, which is the outlet port of the inlet flow path 34, here in this embodiment, without limitation to this embodiment, but the valve seat 44 can be provided at the outlet valve port 78 of the outlet flow path 40 as the valve port.

What is claimed is:

1. A shutoff valve apparatus comprising:
    a valve block having a valve chest;
    an inlet flow path where fluid flows to the valve chest;
    an outlet flow path where fluid flows out of the valve chest;
    a valve seat located in a valve port which comprises one of
        an inlet valve port of the inlet flow path and an outlet valve port of the outlet flow path;
    a metal diaphragm valve element having elastic repulsion force which can be bent and whose cross-section curves are formed circularly, and which is dividingly disposed in said valve chest in an opposed position with respect to said valve seat, and closes said valve port by contacting with said valve seat;
    an actuator plate which comprises an elastomer located on an opposite side of said metal diaphragm valve element to that of the valve port;
    a disc-shaped pressing protrusion formed in the shape of a button and inserted between the central portion of said actuator plate and the central portion of said metal diaphragm valve element, said disc-shaped pressing protrusion being operative to directly contact and press said metal diaphragm valve element against said valve seat, wherein said disc-shaped pressing protrusion has at a lower part thereof a protrusion component, a disc-shaped button holder fixed to the protrusion component and a plate holder which guides linearly said disc-shaped button holder at the lower part, and said actuator plate is mounted and fixed between said disc-shaped button holder and an undersurface of said disc-shaped pressing protrusion;
    an operation chamber which is located on an opposite side of said actuator plate to that of said metal diaphragm valve element, and operation gas is supplied thereto or exhausted therefrom; and
    an operation gas supply exhaust mechanism in which said operation gas is made to supply into or exhaust from said operation chamber,
    wherein said metal diaphragm valve element is pressed against said valve seat through the supply of said operation gas into said operation chamber, and
    wherein when said operation gas is exhausted from said operation chamber, said metal diaphragm valve element returns to an open state by an elastic repulsive force of said actuator plate and said metal diaphragm valve element.

2. The shutoff valve apparatus according to claim 1, wherein said operation gas supply exhaust mechanism has an electromagnetic valve for making operation gas supply into or exhaust from said operation chamber.

3. The shutoff valve apparatus according to claim 1, wherein a concavo-convex seal groove is formed in a surface of the pressing protrusion which faces a surface of said actuator plate.

4. A mass flow control device comprising:
    a mass flow rate detection means to detect the mass flow rate of the fluid which flows into a flow path, and to output a flow signal;
    a flow control valve mechanism which controls a mass flow rate when a valve drive signal changes the valve aperture;

a control means to control said flow control valve mechanism based on said flow signal and a flow set-point signal inputted from the outside; and the shutoff valve apparatus according to claim 3 installed in an upstream and/or downstream side of said flow path.

5. A mass flow control device comprising:

a mass floss rate detection means to detect the mass flow rate of the fluid which flows into a flow path, and to output a flow signal;

a flow control valve mechanism which controls a mass flow rate when a valve drive signal changes the valve aperture;

a control means to control said flow control valve mechanism based on said flow signal and a flow set-point signal inputted from the outside; and the shutoff valve apparatus according to claim 1 installed in an upstream and/or downstream side of said flow path.

6. A shutoff valve apparatus comprising:

a valve block having a valve chest;

an inlet flow path where fluid flows to the valve chest;

an outlet flow path where fluid flows out of the valve chest;

a valve seat located in a valve port which comprises one of an inlet valve port of the inlet flow path and an outlet valve port of the outlet flow path;

a metal diaphragm valve element having elastic repulsion force which can be bent and whose cross-section curves are formed circularly, comprising a metal disc which is located in said valve chest in an opposed position with respect to said valve seat, and closes said valve port by contacting with said valve seat;

a diaphragm holder which presses down the perimeter of said metal diaphragm valve element air-tightly;

an actuator plate which comprises an elastomer disposed on an opposite side of said metal diaphragm valve element to that of the valve port;

a plate holder which presses down the perimeter of said actuator plate air-tightly;

a disc-shaped pressing protrusion formed in the shape of a button, inserted between the central portion of said actuator plate and the central portion of said metal diaphragm valve element, said disc-shaped pressing protrusion being operative to directly contact and press said metal diaphragm valve element against said valve seat, wherein said disc-shaped pressing protrusion has at a lower part thereof a protrusion component, a disc-shaped button holder fixed to the protrusion component and a plate holder which guides linearly said disc-shaped button holder at the lower part, and said actuator plate is mounted and fixed between said disc-shaped button holder and an undersurface of said disc-shaped pressing protrusion;

an operation chamber which is located on an opposite side of said actuator plate to that of said metal diaphragm valve element, and operation gas is supplied thereto or exhausted therefrom; and an operation gas supply exhaust mechanism having an electromagnetic valve which supplies or exhausts said operation gas into or from the operation chamber, wherein said metal diaphragm valve element is pressed against said valve seat through the supply of said operation gas into said operation chamber, and wherein when said operation gas is exhausted from said operation chamber, said metal diaphragm valve element returns to an open state by elastic repulsion force of said actuator plate and said metal diaphragm valve element.

7. A mass flow control device comprising:

a mass flow rate detection means to detect the mass flow rate of the fluid which flows into a flow path, and to output a flow signal;

a flow control valve mechanism which controls a mass flow rate when a valve drive signal changes the valve aperture;

a control means to control said flow control valve mechanism based on said flow signal and a flow set-point signal inputted from the outside; and the shutoff valve apparatus according to claim 6 installed in an upstream and/or downstream side of said flow path.

* * * * *